H. B. COOLEY.

DRINKING CUP.

APPLICATION FILED OCT. 16, 1916.

Reissued May 20, 1919.

14,650.

INVENTOR.

Henry B. Cooley,

BY

Arthur E. Jenkins,

ATTORNEY.

UNITED STATES PATENT OFFICE.

HENRY B. COOLEY, OF KENSINGTON, CONNECTICUT, ASSIGNOR TO THE AMERICAN PAPER GOODS COMPANY, OF MONTCLAIR, NEW JERSEY, A CORPORATION OF NEW JERSEY.

DRINKING-CUP.

14,650. Specification of Reissued Letters Patent. Reissued May 20, 1919.

Original No. 1,148,149, dated July 27, 1915, Serial No. 829,488, filed April 4, 1914. Application for reissue filed October 16, 1916. Serial No. 126,056.

*To all whom it may concern:*

Be it known that I, HENRY B. COOLEY, a citizen of the United States, residing at Kensington, in the county of Hartford and State of Connecticut, have invented a new and Improved Drinking-Cup, of which the following is a specification.

My invention relates more especially to that class of drinking cups that are made from paper or other light material and that are intended for individual use, and an object of my invention, among others, is to provide a cup of this class with its lip thickened to provide sufficient rigidity to resist collapse under weight of the contents.

One form of cup embodying my invention, and in the construction and use of which the objects herein set out, as well as others, may be attained, is illustrated in the accompanying drawings, in which—

Figure 1:
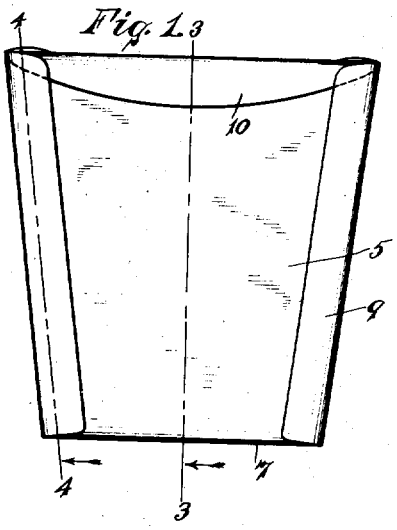
Figure 1 is a view in elevation of one side of a cup embodying my invention.
Figure 3:
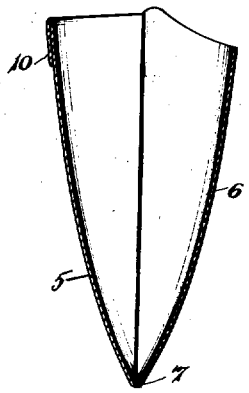
Fig. 3 is a view in lengthwise section on plane denoted by dotted line 3—3 of Fig. 1, the cup being shown as partially opened to illustrate its form when in use for drinking purposes, the thickness of the material being exaggerated.
Figure 5:
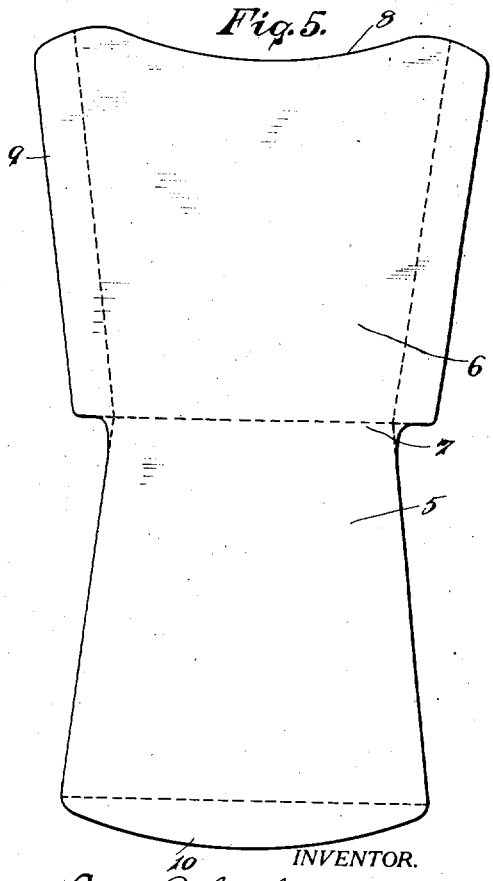
Fig. 5 is a detail view illustrating the blank from which my improved cup is formed.
Figure 2:
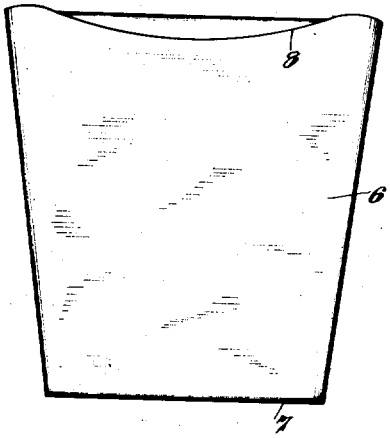
Fig. 2 is a view of the opposite side of the cup.
Figure 4:
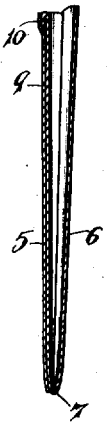
Fig. 4 is a view in section on plane denoted by dotted line 4—4 of Fig. 1, the cup having the same form as in Fig. 3 and the thickness of the material being exaggerated.

My invention appertains to the class of sanitary drinking cups composed of paper or other thin material folded to provide a flat structure, but the back and front walls of which are separate, especially at the top, when required for drinking purposes. Heretofore the lips or drinking edges of the cups have been composed of a single piece of thin material, as paper, with insufficient rigidity to resist collapse from the weight of the contents, with a result that such contents are liable to be spilled upon the person using the cup, and this single thickness also presenting a sharp edge liable to cut the flesh. My improved cup is constructed to overcome these objections and the lip or drinking edge is sufficiently stiff to resist the weight of the contents and prevent collapse, such cup being illustrated in the accompanying drawings, in which the numeral 5 indicates what I term the front flap of the cup, this being the flap, the upper or drinking edge of which is presented to the lips in drinking, and the numeral 6 denotes the back flap. These two flaps are preferably formed of a single piece of material folded at the bottom edge 7 and the back flap is preferably cut-away as at 8 to remove such part as would be liable to make contact with the nose of the person using the cup.

The back flap 6 is provided with longitudinal folded edges 9 adapted to be folded over the front flap 5 to secure the two flaps together and close the seam at the edges of said flaps.

The upper edge of the front flap is provided with a reinforcing or stiffening piece 10 that may be constructed in any desired manner, in a preferred form and as shown herein this being overturned from the flap 5. In order to increase the rigidity of this stiffening piece 10, by preventing a creeping movement crosswise of the cup, this stiffening piece at its ends is located underneath the folds 9 and securely fastened thereunder. In the preferred form of construction both sides of the stiffening piece are provided with an adhesive at the points overlaid by the folds 9 so that the stiffening piece at this point is secured firmly against the outer surface of the front flap 5 and the folds 9 are securely held against the outer surface of the stiffening piece. Preferably the entire under surface of the latter is provided with an adhesive so that it is securely fastened against the outer surface of the flap 5. In order to provide the greatest rigidity at the point of greatest strain the lip 10 is gradually widened from its ends to the center, at which latter point the greatest pressure occurs.

A cup constructed as above described is found to possess all of the requirements for the use to which the cup is intended to be put, and the upper or drinking edge is sufficiently rigid to satisfactorily fulfil all of the functions required of it. It is to be understood, however, that the cup need not be constructed exactly as illustrated and described herein, but that any other construction within the scope of the appended claims will be considered as embodying the invention.

My improved drinking cup combines in one article, the three features required to make a flat drinking cup of its type convenient and in the highest degree efficient, namely; a tapered form, a protected drinking-edge, and a complementary clearance edge. By making the cup of tapered form it is best adapted to be held within the hand of the user, while its flaring edges, stiffened by the side flaps, act as levers for readily forcing the mouth of the cup open, these levers pivoting as it were, upon the corners of the comparatively rigid narrow closed bottom of the cup. The tapered form of the cup also locates the major portion of the water in the cup, relatively high therein and therefore near the mouth thereof, so as to secure the greatest convenience in drinking the water from the cup with the minimum pressure upon its edges. The protection of the drinking edge by its formation with a flap is also important as without such a flap the mouth is apt to be cut. Without cutting down the complementary edge of the cup, to form a clearance space, the cup cannot conveniently be tilted over the upper lip and nose in drinking from it.

My invention is especially intended to enable the production of a compact, convenient, safe, and comparatively inexpensive cup of the kind that are distributed free, and an important feature, among others, is such a cup constructed of thin material. Such thin paper cups having parallel sides require such pressure to retain them with their heavy contents in the hand, that they are readily collapsed, and my improved cups having the tapered edges, therefore, serve a useful purpose as they enable such a cup to be easily supported by the hand against the tapered sides and without a grasp sufficient to collapse the cup. My improved cup combines all of these features in one cup and thus becomes superior to the flat drinking cups of the prior art, none of which have the same convenience and efficiency.

I claim:—

1. A drinking cup consisting of a front and back flap, a stiffening piece overturned on the outside of one of said flaps at the upper edge thereof and extending thereacross, and means overlapping each end of said stiffening piece to secure it in place.

2. A drinking cup including a front and back flap, lengthwise folds for securing said flaps together, and a stiffening piece secured to the drinking edge of the cup and with its ends underlying said flaps and secured in place thereby.

3. A drinking cup composed of a front and a back flap, lengthwise folds for securing said flaps together, and a stiffening piece overturned on the outside of the drinking edge of said cup and extending underneath said folds and provided with an adhesive on its opposite sides to secure it to the flap and to secure the lengthwise folds thereto.

4. A drinking cup consisting of a front and back flap, a stiffening piece secured to the upper edge of one of said flaps and gradually increasing in width from its ends, to its center, and folds at the edges of the cup engaging said stiffening piece to secure it in place.

5. A drinking cup including a front flap and a back flap, the latter being folded lengthwise at its edges onto the front face of the front flap, and a stiffening piece folded over from the upper edge of the front flap and having its ends underlying and secured by the folded edges of the back flap.

6. As a new article of manufacture, a flat paper drinking cup formed from a relatively long blank folded transversely to produce two flat complementary body-flaps together forming a cup-body which is closed at its bottom end by said transverse fold, one of the said body-flaps being formed at its outer end with a supplemental flap arranged at a right angle to the axis of the cup and folded transversely thereto upon one face of the said body-flap to produce a smooth drinking edge for the cup, one of the said body-flaps being made transversely wider than the other body-flap to form two flat, laterally projecting, integral fastening-flaps which are folded flatwise around and over the respective edges of the narrower body-flap to inclose the same, said flaps being folded upon the outer face of said narrower body flap to which they are adhered, the said fastening-flaps being folded so as not to fold the upper parts of the side edges of the narrower body flap, whereby the finished cup near its edges comprises only two thicknesses of the wider body-flap and one thickness of the narrower body-flap.

HENRY B. COOLEY.